No. 877,467. PATENTED JAN. 21, 1908.
W. S. MOODY.
COOLING SYSTEM FOR ELECTRIC RAILWAY APPARATUS.
APPLICATION FILED JUNE 16, 1906.
3 SHEETS—SHEET 1.
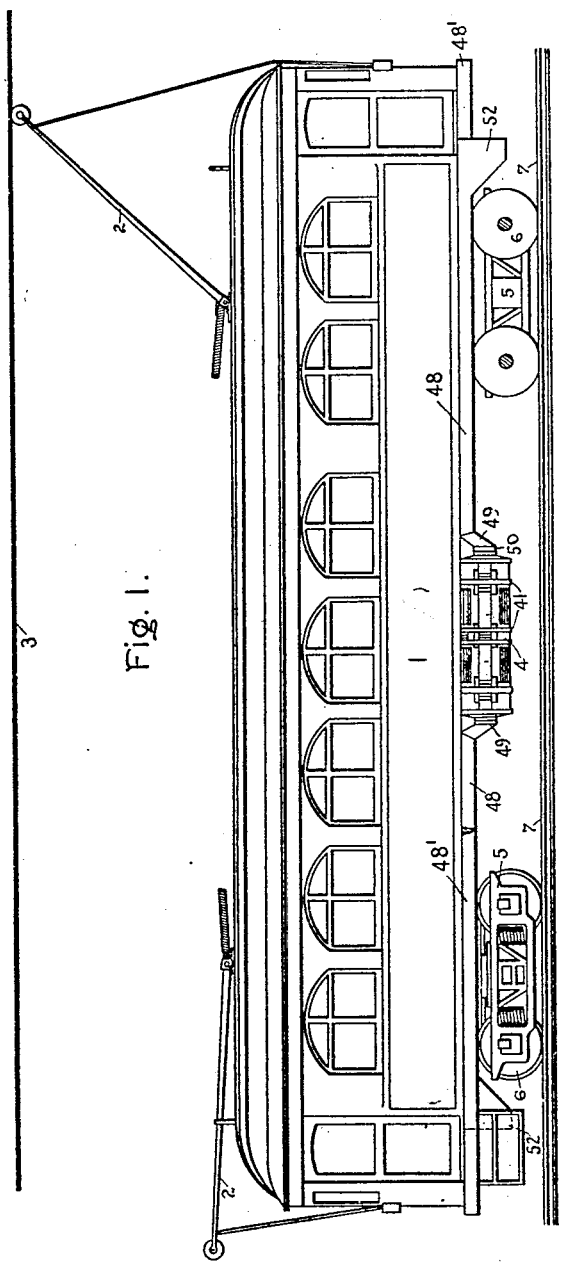
Witnesses:
Inventor:
Walter S. Moody,
by Albert G. Davis
Att'y.

No. 877,467. PATENTED JAN. 21, 1908.
W. S. MOODY.
COOLING SYSTEM FOR ELECTRIC RAILWAY APPARATUS.
APPLICATION FILED JUNE 16, 1906.
3 SHEETS—SHEET 2.
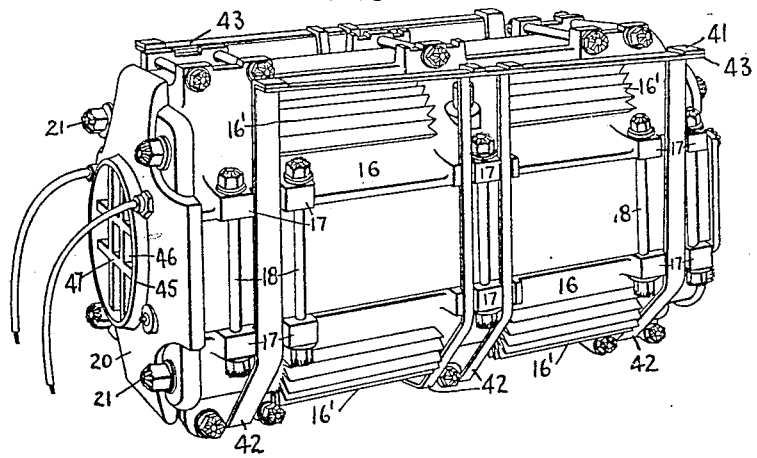
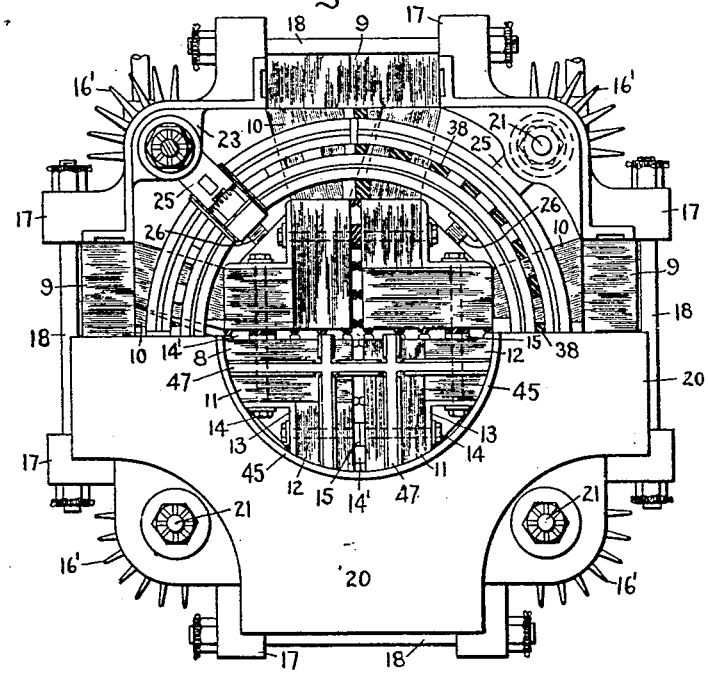
Witnesses:
Inventor
Walter S Moody,
By Albert G. Davis
Att'y.

No. 877,467.

PATENTED JAN. 21, 1908.

W. S. MOODY.
COOLING SYSTEM FOR ELECTRIC RAILWAY APPARATUS.
APPLICATION FILED JUNE 16, 1906.

3 SHEETS—SHEET 3.

Witnesses:

Inventor:
Walter S. Moody
by Albert G. Davis
Att'y.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

COOLING SYSTEM FOR ELECTRIC-RAILWAY APPARATUS.

No. 877,467.  Specification of Letters Patent.  Patented Jan. 21, 1908.

Original application filed August 10, 1904, Serial No. 220,160. Divided and this application filed June 16, 1906. Serial No. 322,016.

*To all whom it may concern:*

Be it known that I, WALTER S. MOODY, a citizen of the United States, residing at Schenectady, county of Schenectady, State of New York, have invented certain new and useful Improvements in Cooling Systems for Electric-Railway Apparatus, (division of my application, Serial No. 220,160, filed August 10, 1904,) of which the following is a specification.

It is sometimes desirable to supply alternating current at one potential from stationary supply conductors to one winding of a transformer located on a movable vehicle, the other winding of the transformer furnishing alternating current of different potential to consuming devices located on or traveling with the vehicle. For instance, the motors which propel electric railway cars may be driven by alternating current furnished to the low-pressure winding of a transformer carried by the car, the high pressure winding of which is supplied with alternating current through stationary conductors and traveling contacts. It is highly desirable that a transformer for use on an electric car should be as compact and of as small a weight as possible.

The object of my invention is to provide an arrangement of the transformer and of a ventilating system therefor, such that the size and weight of the transformer may be reduced to a minimum.

The various features of novelty which characterize my invention are pointed out with particularity in the claims annexed to and forming a part of this specification. For a better understanding of my invention, however, reference may be had to the accompanying drawings and description in which I have illustrated and described one embodiment of my invention.

Figure 8:
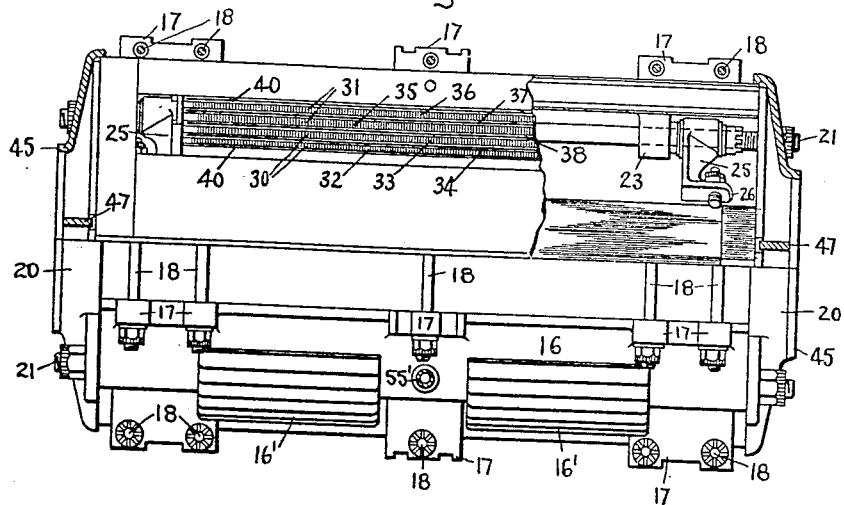
Figure 9:
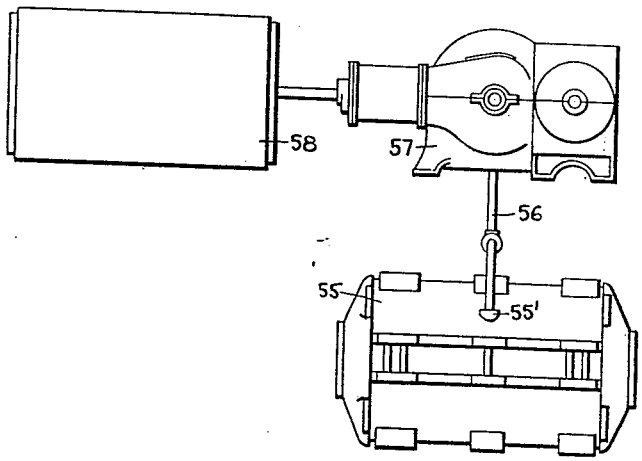

Of the drawings, Figure 1 is an elevation of an electric car equipped with my invention; Fig. 2 is a sectional elevation showing the arrangement of the conduit; Fig. 3 is a partial sectional elevation showing the hood at one end of the conduit; Fig. 4 is an elevation showing a trap which may be employed; Fig. 5 is an elevation showing the removable conduit section; Fig. 6 is a perspective view of the transformer employed; Fig. 7 is an end elevation of the transformer with parts broken away and in section; Fig. 8 is a side elevation of the transformer with parts broken away and in section; and Fig. 9 is a diagrammatic view showing an arrangement of the transformer, air compressor, and air reservoir.

Referring to the drawing, 1 represents a car of the ordinary type employed on high speed interurban electric railways. Trolley poles 2 located at each end of the car are alternately employed to take alternating current from an overhead conductor 3 at comparatively high potential, say 2,000 volts, and deliver it to the primary winding of a transformer 4 located below the car body. The secondary of the transformer supplies current at a reduced potential, say 400 volts, to suitable motors mounted on the trucks 5. The return conductor of the primary system includes the wheels 6 and rails 7.

The core of the transformer, which is substantially of the type shown by the patent to Hall, No. 755,766, granted March 29, 1904, comprises a central elongated horizontal leg or portion 8 and four legs or branches 9 which are similar to each other and are spaced equally about the leg 8 and extend parallel therewith, and portions 10 which extend radially from each end of the leg or branch 8 to the ends of the legs or branches 9. The windings of the transformer surround the central leg 8 and are located in the space between the legs 9 and end portions 10.

Each outer leg 9, corresponding end portions 10, and a quarter of the central leg or portion 8 of the core, are formed by two bundles 11 and 12 of laminæ of magnetic material. The bundles 11 are similar to the bundles 12 in that they are both rectangular in outline and formed with rectangular openings passing through them. The bundles differ from each other, however, in the fact that the inner legs of the bundles 11 are substantially twice as wide as the corresponding legs of the bundles 12. The inner portions of the four pairs of bundles 11 and 12 forming the core are assembled together as shown to form the central leg or branch 8 which is cruciform in cross-section.

Angle bars or plates 13 are placed in the notched corners of the cruciform-shaped central leg or core 8 with their outer surfaces bearing against the sides of the laminæ.

The inner legs of each pair of bundles 11 and 12 are clamped together by bolts 14 which pass transversely through the bundles 11 and 12 and the adjacent flanges of the angle bars 13. As is clearly shown in the drawings, a cross-shaped ventilating space 14' extends through central leg or branch 8, the laminæ being separated by spacers 15 for this purpose.

Each outer leg 9, which is substantially rectangular in cross-section, is shown as somewhat wider in a direction measured perpendicular to the plane of lamination than is the central leg 8. This result is obtained by interleaving with the laminæ in the legs 9 corresponding to those in the inner legs or sides of the bundles 11 and 12 additional laminæ. Convexly curved members 16, which may be formed of cast iron or the like, are located between adjacent sides of the adjacent core legs 9. The members 16 are formed with faces or surfaces at right angles to each other, which abut against the sides of the adjacent core legs. The outer edges of these faces are flush with the outer edges of the core legs. The members 16 are formed with lugs 17 which are located adjacent to and project beyond the outer surfaces of the core legs. Bolts 18 passing through apertures formed in the lugs 17 are employed to clamp each core leg between the adjacent members 16. As shown, the bolts 18 are located beyond the outer surface of the corresponding core leg 9. The members 16 are formed on their outer surfaces with heat-dissipating ribs 16' which extend parallel to the length of the transformer and the line of motion of the car.

End plates or head members 20 are clamped against the ends of the core and the ends of the members 16 by bolts 21. The bolts 21 pass through and are positioned by apertured lugs 23 projecting for the purpose from the inner surface of the members 16. To stiffen the construction, members 25 pivoted on the bolts 21 have formed in them threaded apertures in which are located bolts 26, the ends of which are forced against the angle bars 13.

The windings of the transformers comprise two concentric sections 30 and 31. The inner section 30 in turn comprises an inner primary coil 32 preferably formed out of a copper strip bent edgewise to form a helix, and an outer secondary coil 33 which preferably is also in the form of a copper strip or ribbon bent edgewise into a helix. A layer 34 of insulating material is placed between the coils 31 and 32 which may be taped together. The outer section 31 is formed of an inner secondary coil 35 which is substantially similar to the coil 33 and an outer primary coil 36 which is substantially similar to the coil 32. The coils 35 and 36 are separated by a layer of insulating material 37 and may be taped together as are the coils 32 and 33. The sections 30 and 31 are separated from each other to form a ventilating space by separators or space blocks 38.

The coils, which themselves possess considerable mechanical strength by reason of their construction, are locked tightly in place between the central leg 8 of the core and the outer leg 9 by strips or spacers 40 of insulating material. After the coils are firmly locked in place by the spacers 40 the coils and core are several times dipped in a heavy insulating compound or paint to seal the core, the spacing strips and the coils into a rigid mechanical structure. The exterior of the shell formed by the legs 9 and member 16 is made water-tight by a coating of waterproof paint or the like.

The transformer is placed beneath the car body with the legs 8 and 9 extending parallel to the direction of movement of the car and is supported by a skeleton frame or cradle 41 comprising a number of substantially U-shaped wrought iron bars 42 which are connected at their upper ends by rails 43. Notches are formed in the lugs 17 to receive and position the U-shaped members 42. Bolts passing through the U-shaped bars 42 and rails 43 are employed to secure the cradle to the car structure.

As is clearly shown in the drawings, the end plates of the transformer are formed each with a cylindrical flange or lip 45 which surrounds an opening 46 centrally located in the end plate. To stiffen the structure a number of bars 47 extend transversely across the openings 46. Conduits 48, the bodies of which are located between the floor-beams 48' of the car, extend from points adjacent the ends of the transformer to points adjacent the ends of the car. A pipe or conduit section 49 is employed to connect each end of the transformer to the adjacent end of the corresponding conduit. The conduit section 49 may be hinged to the conduit body as shown at 49' and provided with a collar 50 which may be locked removably about the flange 45 by thumb screws 51 as shown in Fig. 5. A hood or funnel 52 is connected to the outer end of each conduit. It will be readily understood that the movement of the car will cause air to be taken in by the forward funnel and delivered through the forward conduit 48 and section 49 to the interior of the transformer from which it will escape through the rear section 49, conduit 48, and funnel 52. The passage of air through the transformer will, of course, remove heat generated in the transformer.

To prevent the entrance of dirt into the transformer a screen 53 is placed at the mouth of each funnel. Traps 54 (see Fig. 4) are preferably provided in the conduits at each side of the transformer, into which the bulk of the dirt passing the corresponding screens is collected. The traps 54 also serve to prevent rain and snow from entering the transformer. By making the conduit sections 49 removable as described, the interior of the transformer can be readily cleaned of any dirt which may accumulate in it by the use of a compressed air cleaning device.

As shown diagrammatically in Fig. 9 of the drawings, I may connect the intake pipe 56 of the air compressor 57, which fills the reservoir 58 with air for the operation of the car brakes, to take air from the interior of the transformer. The pipe 56 may be connected to the middle of the upper cover plates 55 by connections 55' as shown. This increases the air circulation through the transformer in an advantageous manner as the brakes are used most frequently and consequently the air pumped most rapidly by the compressor when the car is running at comparatively low speed and when therefore the circulation produced by the motion of the car proper is least noticeable.

The transformer construction which I have herein described and illustrated in detail, possesses many advantageous features of construction and arrangement which are not limited to use for any particular purpose or in any particular arrangement. The construction, however, embodies features which are particularly useful when the transformer is to be mounted beneath a car as shown in Fig. 1. The design is one in which the length of the transformer may be made comparatively great with reference to the dimensions of the transformer. This is of importance in view of the limited space in which the transformer must be supported.

It is frequently desirable to make a transformer air-cooled rather than oil-cooled to economize space by dispensing with the oil-containing casing or for other reasons. With the construction shown, an air-cooled transformer is obtained in which the windings are thoroughly protected and incased while at the same time the casing employed is such as to leave a very large portion of the core surface exposed to the outside air, thus facilitating heat radiation.

As shown, the upper and lower legs 9 of the corresponding end portions 10 and portion of leg 8 are laminated in vertical planes, while the remainder of the core is laminated in horizontal planes. It will thus be observed that all the electrical and magnetic advantages to be obtained by laminating the core are possessed by this construction, while at the same time the arrangement is such that the laminating of the core in vertical planes does not weaken that portion of the core against up and down vibration which is best able to maintain the rigidity of the core against such vibrations, while the laminating of the remainder of the core does not weaken the core against horizontal vibrations.

What I claim as new, and desire to secure by Letters Patent of the United States, is,—

1. In combination, an electric railway car equipped with an air-brake system supplied with air from an intermittently operating air-compressor apparatus arranged to maintain a substantially constant air-pressure in the air-brake reservoir, an electric device inclosed in a casing, means for cooling said device consisting of a conduit attached to the casing of said device, and open and exposed to the air-pressure generated by the car through its motion, for causing the movement of the car to force air through said device, and a connection from the intake pipe of the air compressor to the casing of said device for causing the air-compressor to pass a current of air through said device.

2. In combination, an electric railway car equipped with an air-brake system supplied with air from an intermittently operating air-compressor apparatus arranged to maintain a substantially constant air-pressure in the air-brake reservoir, an electric transformer inclosed in a casing, means for cooling said device consisting of a conduit connected to said casing, for causing the movement of the car to force air through said transformer, and a connection between the air-compressor apparatus and the transformer casing for causing said apparatus to pass a current of air through the transformer.

3. In combination, an electric railway car equipped with an air-brake system supplied with air from an air-compressor normally performing its maximum duty when the brakes are applied most frequently, an electric device mounted on said car, and two means for cooling said device, one of said means producing its greatest effect when the car is running at high speed, and the other of said means ordinarily producing its greatest effect when the car is running at comparatively low speeds.

4. In an electric railway car arranged to operate from a high potential alternating-current with a transformer for supplying current to the motors at a low voltage, and a motor-operated air-compressor apparatus supplying air to the air-brake system, the combination of means for cooling said transformer, one of said means producing its greatest effect when the car is running at high speeds and another of said means ordinarily producing its greatest effect when the car is running at comparatively low speeds.

5. In an electric railway car arranged to operate from a high potential alternating-current with a transformer inclosed in a casing for supplying current to the motors at low voltage and equipped with an air-brake system supplied with air from an air-compressor normally performing its maximum duty when the brakes are applied most frequently, means for cooling said transformer consisting of a conduit attached to the transformer casing for causing the movement of the car to force air through said transformer, and a connection from the air-intake pipe of the air compressor to the casing of the transformer for causing the air-compressor to force air through said transformer.

In witness whereof I have hereunto set my hand this 12th day of June, 1906.

WALTER S. MOODY.

Witnesses:
BENJAMIN B. HULL,
MARGARET E. WOOLLEY